S. KINGSLAND.
Apparatus for Preventing Horses from Running away, or Kicking.
No. 223,447. Patented Jan. 13, 1880.
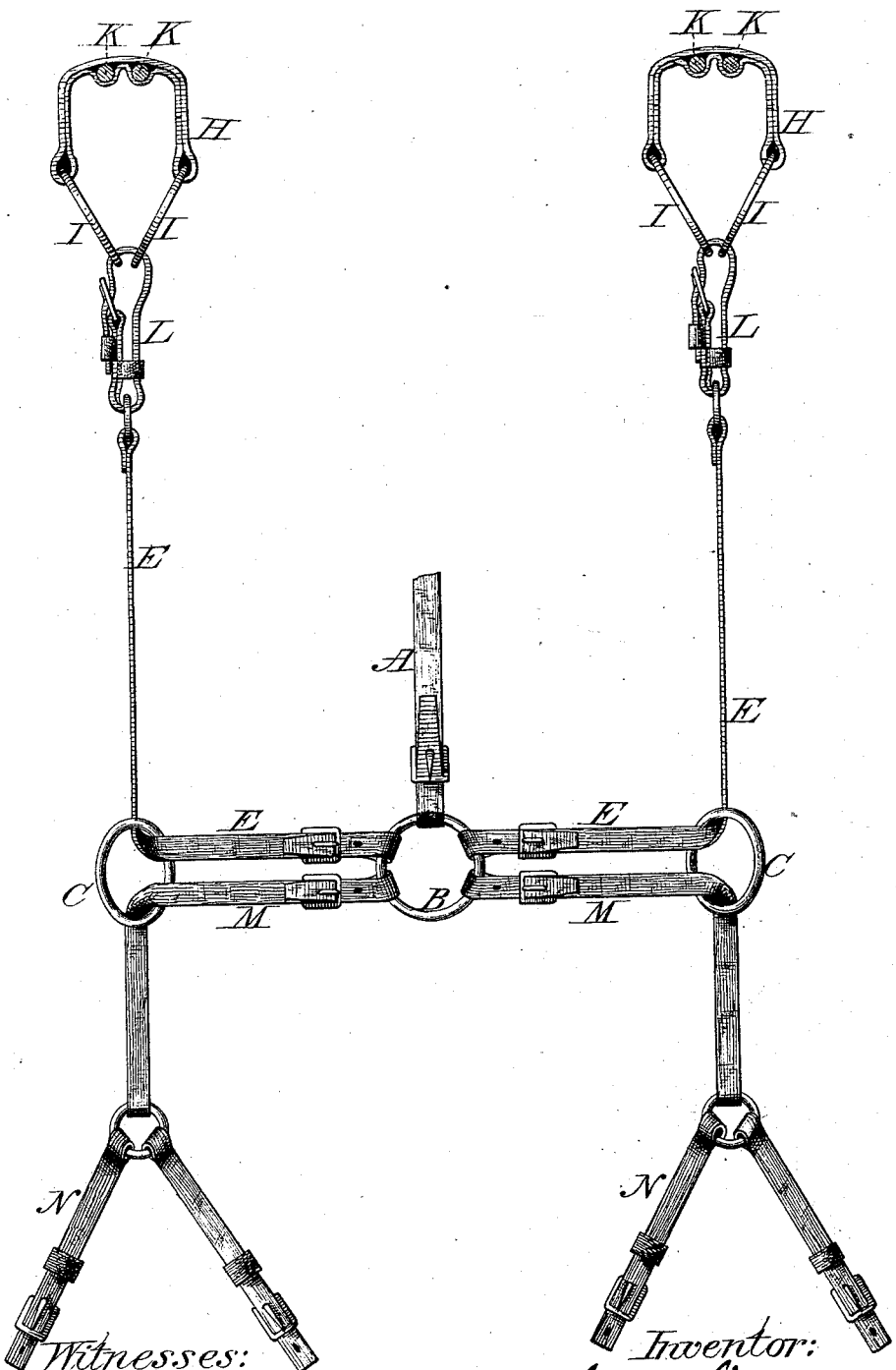

UNITED STATES PATENT OFFICE.

SAMUEL KINGSLAND, OF SIOUX CITY, IOWA.

APPARATUS FOR PREVENTING HORSES FROM RUNNING AWAY OR KICKING.

SPECIFICATION forming part of Letters Patent No. 223,447, dated January 13, 1880.
Application filed November 3, 1879.

*To all whom it may concern:*

Be it known that I, SAMUEL KINGSLAND, of Sioux City, in the county of Woodbury and State of Iowa, have invented a new and useful Invention or Device to Prevent Horses from Running Away or Kicking in Harness, of which the following is a specification.

The device or invention consists in an attachment to the harness as follows, and as shown in accompanying drawing, A being a center line or strap running between the horses, and adapted to be attached to a pulley on the front part of a vehicle. (Not shown in the drawing.) At the forward end of said line is a ring, B. E is a strap passing from ring B through ring C, which is attached to the belly-band of the harness, and from thence passing to and attached to a clamp-strap, H, which clamp-strap is adapted to be applied around the animal's hind leg above the gambrel joint. Said strap has a ring, I, attached at each end, adapted to pass around the leg, and two cork rolls, K K, within the clamp-strap, are far enough apart to allow the hamstring to work free between them. The clamp-strap H should not meet around the leg by two inches. L is a short strap passing through the rings of the clamp-strap H and the rings on the end of straps E, and is provided with a buckle. M is a strap attached to ring B and passes through ring C, and thence between the animal's fore legs to the bridle-bits, and is attached to the bits on each side by short straps N N.

The device, when arranged and attached to the animal and the line A, is attached to a pulley placed on an upright on the front part of a vehicle convenient to the driver. If the animals attempt to run or kick, the driver may turn the crank and pulley connected with strap A, thus drawing the animal's hind legs and head together with little effort and without injury.

What I claim is—

The holding-strap A, in combination with sliding straps E and M, fastening-straps L, rings B, C, and I, and leg-straps H, provided with cork rolls K, all arranged substantially as shown, and adapted to be operated by any suitable means attached to a vehicle, as set forth.

In witness whereof I have hereto set my hand.

his
SAMUEL  ×  KINGSLAND.
      mark.

Witnesses:
 S. P. VANATTA,
 DAVID JENNINGS.